United States Patent [19]
Leavitt

[11] 3,778,155
[45] Dec. 11, 1973

[54] METHOD AND APPARATUS FOR REDUCING OPTICAL INTERFERENCE PATTERNS RECORDED BY CONTACT PRINTERS

[75] Inventor: Minard A. Leavitt, Sepulveda, Calif.

[73] Assignee: Cutter-Hammer, Inc., Milwaukee, Wis.

[22] Filed: Aug. 7, 1972

[21] Appl. No.: 278,634

[52] U.S. Cl.......................... 355/91, 226/95, 355/87
[51] Int. Cl. ............................................ G03b 27/20
[58] Field of Search........................ 355/91, 92, 87; 226/7, 95, 97

[56] References Cited
UNITED STATES PATENTS

| | | | |
|---|---|---|---|
| 3,161,120 | 12/1964 | Timares et al. | 226/95 X |
| 3,667,845 | 6/1972 | Leavitt et al. | 355/91 |
| 3,656,852 | 6/1970 | Oetting | 355/91 |
| 3,468,606 | 9/1969 | Wolf et al. | 355/91 |

*Primary Examiner*—Richard L. Moses
*Attorney*—Robert L. Parker et al.

[57] ABSTRACT

Optical interference patterns between adjacent surfaces of a flexible photographic transparency and an unexposed film is reduced by applying to the transparency a time variable, preferably direction-oscillating force to vary the separation and/or angle between irregular areas of the adjacent surfaces. In a continuous contact printer where a length of transparency and a length of unexposed film are transported past a light source, a spatially variable force field is established along the length of the transparency by inducing flow of oppositely directed gas streams. A first plurality of transverse grooves formed in a block overlying the non-adjacent surface of the transparency are connected to a source of fluid under pressure. A second plurality of transverse grooves formed in the block between respective ones of the first plurality of grooves are connected to a fluid sink at lower pressure. Fluid from each one of the first plurality of grooves flows to the adjacent ones of the second plurality of grooves.

24 Claims, 8 Drawing Figures

METHOD AND APPARATUS FOR REDUCING OPTICAL INTERFERENCE PATTERNS RECORDED BY CONTACT PRINTERS

BACKGROUND OF THE INVENTION

This invention relates to the suppression of recorded optical interference patterns and, more particularly, to a method and apparatus suitable for reducing optical interference patterns in a continuous contact printer.

In a continuous contact printer, a length of master film bearing a photographic image transparency and a length of duplicate film bearing an unexposed photographic emulsion in contact with the transparency are transported past a source of light to transfer the image from the master film to the duplicate film. Good contact, i.e., intimate contact, between the films is a goal in the design of a contact printer because the fidelity and resolution of the image transferred to the duplicate film depend thereon. A copending application of Minard A. Leavitt and Poul B. Roulund, application Ser. No. 114,600, filed Feb. 11, 1971, discloses a continuous contact printer in which a high degree of contact between the films is established by air pressure exerted on the non-adjacent surfaces of the films.

In contact printers that achieve good contact, such as the contact printer disclosed in application Ser. No. 114,600, some areas of the adjacent surfaces of the films are non-uniformly separated a distance in the order of magnitude of the wavelength of light, due to surface irregularities, i.e., deviations from flatness, and the entrapment of dust particles or air bubbles between the film. As a result, optical interference produces dark and light bands, i.e., so-called Newton rings, on the photographic emulsion. Dust particles as large as several microns may also cause such optical interference. To the extent these interference bands are visible to the human eye, or the image detecting apparatus, as the case may be, they degrade the fidelity of the image transferred to the duplicate film.

Various techniques have been employed to reduce the level of interference bands to a point below the contrast threshold level of the human eye and/or image detecting apparatus. For example, film with a matte finish has been used to scatter the reflected light; the light that exposes the film has been intentionally decollimated; and special film materials have been employed to reduce surface irregularities. For the most part, these techniques tend unduly to degrade the fidelity and resolution of the image on the duplicate film, thereby offsetting the benefits of good contact between the films.

SUMMARY OF THE INVENTION

According to the invention, optical interference between adjacent surfaces of a first piece of flexible material and a second piece of material is suppressed by applying to the flexible piece of material a time variable force to vary the separation and/or angle between the adjacent surfaces where surface irregularities or entrapment occur. Consequently, the interference bands, which are critically dependent upon the distance of the separation, move with respect to the recording film surface and consequently are greatly attenuated. In most applications, the invention is used to transfer an image from one of the pieces of material to the other. In a sense, the interference bands are averaged out or smeared by the movement of the flexible piece, without unduly degrading the fidelity or resolution of the transferred image. Preferably, the time variable force is periodic and oscillates in direction parallel to the adjacent surfaces of the first and second pieces.

The invention is particularly well suited for use in a continuous contact printer. The time variable force is applied to one film length by establishing a spatially variable force field longitudinally along its non-adjacent surface. If fluid pressure is employed to bring the film lengths into contact the spatially variable force field is most advantageously developed by forming a plurality of oppositely directed arcuate fluid streams in communication with the non-adjacent surface of the one film length. As the film lengths are transported, the spatially variable force field exerts a time variable force on the one film length.

In one embodiment of apparatus for practicing the invention, a first plurality of transverse grooves are formed in one side of a block of transparent material. The one side of the block is closely spaced from the non-adjacent surface of the flexible piece. Fluid under pressure is supplied to the first plurality of grooves. A second plurality of grooves are formed in the one side of the block between respective ones of the first plurality of grooves. The second plurality of grooves are connected to atmosphere a fluid sink at a lower pressure than the source. Thus, fluid streams flow from each one of the first plurality of grooves to the adjacent ones of the second plurality of grooves.

BRIEF DESCRIPTION OF THE DRAWINGS

The features of a specific embodiment of the best mode contemplated of carrying out the invention are illustrated in the drawings, in which.

DETAILED DESCRIPTION OF THE DRAWINGS

Figure 1:
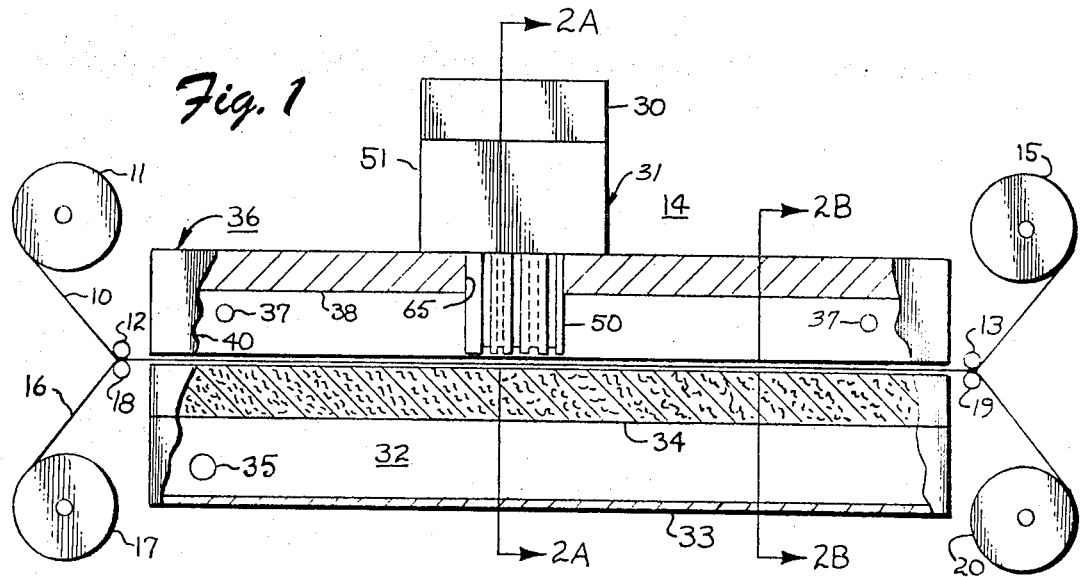
FIG. 1 is a front partial section view of a continuous contact printer employing the principles of the invention.

In FIG. 1 a length 10 of master film stored on a supply reel 11 is guided by rollers 12 and 13 in a path that leads through a contact printer 14 to a takeup reel 15. A length 16 of duplicate film stored on a supply reel 17 is guided by rollers 18 and 19 in a path that leads through contact printer 14 adjacent to film length 10 to a takeup reel 20. Film length 10 bears a photographic image transparency and the adjacent surface of film length 16 bears a photographic emulsion. As described in more detail below, film lengths 10 and 16 are held in intimate contact as they pass through contact printer 14, and are exposed to light from a source 30. Thus, as film lengths 10 and 16 are transported from their respective supply reels to their respective takeup reels by means not shown in the drawings, the images on film length 10 are transferred to film length 16.

The disclosure of application Ser. No. 114,600 is incorporated herein by reference. Contact printer 14, which is essentially the same as the contact printer disclosed in application Ser. No. 114,600 except for the addition of a component 31, develops static air pressure that applies a spatially constant force to each of the non-adjacent surfaces of film lengths 10 and 16 to bring the adjacent surfaces of film lengths 10 and 16 into intimate contact. Component 31 establishes a spatially variable force field over the portion of the non-adjacent surface of film length 10 exposed to light from source 30. A plenum chamber 32 is defined by an elongated housing 33 that is open at the top and a platen 34 that covers the opening in housing 33. The top surface of platen 34 is contiguous to the non-adjacent side of film length 16. Air under pressure is supplied to chamber 32 through an inlet 35 and is maintained in chamber 32 at a pressure substantially above the ambient pressure. Platen 34 is made from a microporous material such as Tamastone, oilite, filter porcelain, or a porous sintered metal. As a result, there are formed through platen 34 a very large number of multidirectional escape paths for air from chamber 32. Because of the high resistance of the porous material comprising platen 34, air flows out of plenum chamber 32 at a very low rate and undergoes a very large pressure drop across platen 34. Thus, the air substantially at zero velocity as it leaves platen 34 forms an air cushion under film length 16 that supports film length 16 in spaced relationship from the upper surface of platen 34.

Figure 2A:
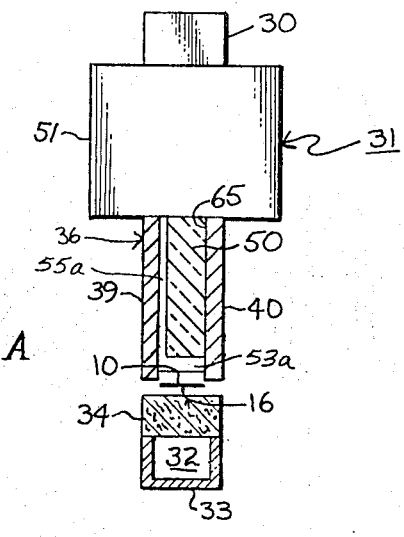
FIGS. 2A and 2B are side section views of the contact printer of FIG. 1.
Figure 2B:
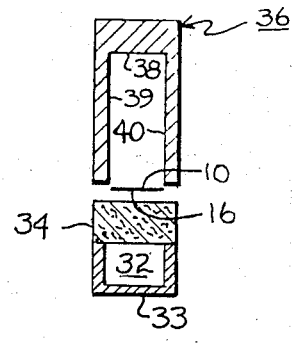

An elongated trough-shaped housing 36 partially encloses the space over film lengths 10 and 16 where they pass across platen 34. Air under pressure is supplied to this space through inlets 37. As depicted in FIGS. 2A and 2B, housing 36 has a flat center portion 38 parallel to and spaced a relatively large distance from platen 34 and has transverse side portions 39 and 40 that extend toward platen 34. The ends of side portions 39 and 40 are spaced a relatively short distance from platen 34 to form narrow longitudinal exits through which the air entering the space enclosed by housing 36 escapes to the atmosphere. The spacing between side portions 39 and 40 is about the same as the width of film lengths 10 and 16, which are suspended slightly by the air cushion under film length 16 below the ends of side portions 39 and 40, as shown in FIGS. 2A and 2B. The constriction in air flow occurring at the longitudinal exits develops over the non-adjacent surface of film length 10 a high static head that drops off sharply at the film edges due to the Venturi principle. The resulting air pressure exerted on the non-adjacent surface of film length 10 presses film length 10 into intimate contact with film length 16.

Figure 3:
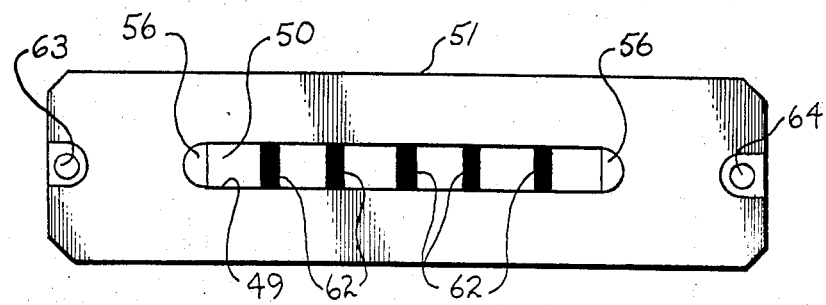
FIG. 3 is a top plan view of a component of the contact printer of FIG. 1, which produces a spatially variable force field.
Figure 4:
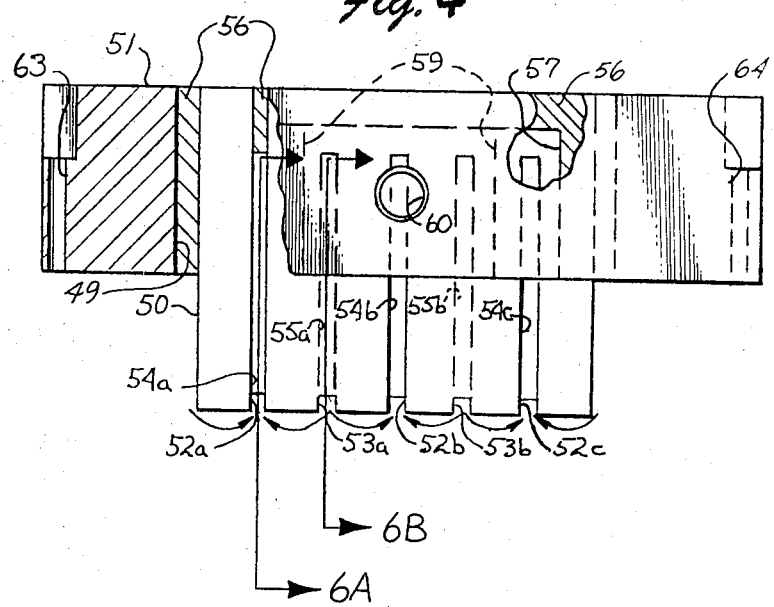
FIG. 4 is a front partial section view of the component of FIG. 3.
Figure 5:
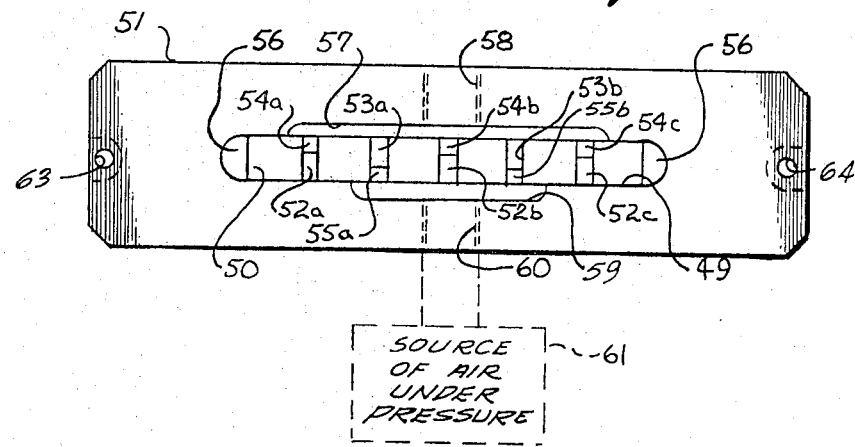
FIG. 5 is a bottom plan view of the component of FIG. 3.
Figure 6:
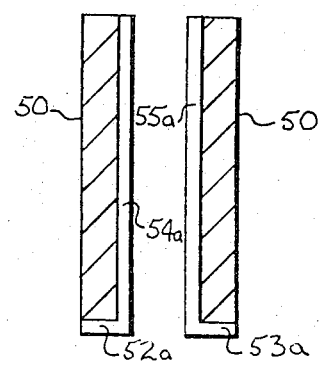
FIGS. 6A and 6B are side section views of the block of transparent material depicted in FIG. 4.

As illustrated in FIGS. 3, 4, and 5, component 31 comprises an elongated block 50 of transparent material such as optical grade quartz, and a housing 51. The top of block 50 fits into an elongated vertical slot 49 formed in housing 51 and is flush with the top surface of housing 51. The bottom of block 50 extends below the bottom surface of housing 51. In the bottom side of block 50 are formed a plurality of parallel grooves 52a, 52b, and 52c, and a plurality of parallel grooves 53a and 53b disposed between respective ones of grooves 52a, 52b, and 52c. A plurality of parallel grooves 54a, 54b, and 54c are formed in one vertical side of block 50 so as to meet grooves 52a, 52b, and 52c, respectively, at one edge of block 50. Similarly, a plurality of parallel grooves 55a and 55b are formed in the opposite vertical side of block 50 so as to meet grooves 53a and 53b, respectively, at one edge of block 50. (See FIGS. 6A and 6B for sectional views of block 50 illustrating these groove networks, which could be formed in the side surfaces of block 50 by grinding.) The space between the ends of slot 49 and block 50 and the tops of grooves 54a, 54b, 54c, 55a, and 55b are filled with a sealing material 56, such as epoxy. A cavity 57, which is formed in the side wall of slot 49 extends laterally between grooves 54a, 54b, and 54c, as illustrated in FIG. 5, and extends longitudinally from the bottom of housing 51 to a point short of the top of housing 51, as illustrated in FIG. 4. Cavity 57 serves as a manifold for connecting grooves 54a, 54b, and 54c to the atmosphere through a conduit 58, which is formed in housing 51. A cavity 59, which is formed in the opposite side wall of slot 49 extends laterally between grooves 55a and 55b, as illustrated in FIG. 5, and extends longitudinally from the bottom of housing 51 to a point short of the top of housing 51, as illustrated in FIG. 4. Cavity 59 serves as a manifold to connect grooves 55a and 55b through a conduit 60, which is formed in housing 51, to a source 61 of air under pressure. The top surface of block 50 has parallel opaque stripes 62 in registration with grooves 52a, 53a, 52b, 53b, and 52c. Stripes 62, which could comprise black paint or tape, prevent the transmission of light through the portions of block 50 in which the groove networks are formed. As a result, there are six discrete windows formed in block 50 for the passage of light from its upper surface to its lower surface. To prevent stray reflection of light passing through block 50, the four vertical sides thereof are preferably coated with black light absorbent paint. Screw mounting holes 63 and 64 are drilled through the ends of housing 51.

As illustrated in FIG. 1, component 31 is mounted on housing 36. Block 50 extends through a close fitting opening 65 in center portion 38, and housing 51 is fixed to the top of center portion 38 by screws (not shown) that pass through mounting holes 63 and 64. A gasket (not shown) between the bottom surface of housing 51 and the top surface of center portion 38 prevents leakage of air between these surfaces to the atmosphere. Grooves 54a, 54b, and 54c are covered by transverse side portion 40, and grooves 55a and 55b are covered by transverse side portion 39 to form closed vertical channels. The bottom side of block 50 is spaced closely from the non-adjacent surface of film length 10. Air from source 61 passes through conduit 60 to cavity 59 where it is distributed to grooves 55a and 55b. Grooves 55a and 55b deliver the air to grooves 53a and 53b, respectively. From groove 53a air streams flow to grooves 52a and 52b. From groove 53b air streams flow to grooves 52b and 52c. It is assumed the static pressure in the space enclosed by housing 36 is higher than the pressure of the air supplied to source 61 to grooves 52a and 52c, so air streams also flow from the edges of block 50 parallel to grooves 52a and 52c to grooves 52a and 52c, respectively. These air streams, which are represented in FIG. 4 by arrows at the bottom side of block 50, flow in an arcuate path because the spacing between grooves is not too large relative to the width of the grooves. Consequently, there is established between the bottom side of block 50 and the non-adjacent surface of film length 10 a spatially variable, direction changing force along the film length.

This variable force has an oscillating component parallel to the non-adjacent surface of film length 10. As film length 10 passes the bottom side of block 50, the described spatially variable force field exerts on each incremental area across the non-adjacent surface of film length 10 a time varying force. The time varying force changes the separation and/or angles between areas of the adjacent surfaces of film lengths 10 and 16 where surface irregularities occur, thereby suppressing optical interference. Source 30, which is mounted on the top of housing 51, directs collimated light through the windows of block 50 onto film lengths 10 and 16. The light collimated substantially perpendicular to the adjacent surfaces of film lengths 10 and 16 exposes the adjacent surface of film length 16 to transfer the images from film length 10 thereto. The optical interference patterns are suppressed according to the invention without unduly degrading the resolution of the images transferred to duplicate film length 16. In one specific case, the resolution was degraded by less than 15 percent as the interference bands on the duplicate film were reduced to a point at which they were no longer visible to the human eye.

By way of example, source 61 could provide air at a pressure of 5 psig, the static pressure of the air enclosed by housing 36 could be 2 psig, the distance from the bottom side of block 50 to the edges of transverse side portions 39 and 40 could be 0.005 inches, the height of the grooves could be 0.125 inches, the width of the grooves could be 0.100 inches, and the spacing between grooves could be 0.375 inches.

The described embodiment of the invention is only considered to be preferred and illustrative of the inventive concept as applied to a continuous contact printer; the scope of the invention is not to be restricted to such embodiment. Various and numerous other arrangements may be devised by one skilled in the art without departing from the spirit and scope of this invention. For example, in some cases a time variable force could be applied in a direction transverse to the length of the film instead of or in addition to the time variable force applied parallel to the length of the film. Further, the use of a spatially variable force field to produce a time varying force is only applicable when film is being transported during the application of the force. If the film is stationary, a time varying force must be created in another manner such as, for example, varying the pressure of source 61 as a function of time. Moreover, the time varying force can be applied in other ways than with fluid streams such as, for example, a vibrating physical contact with the film. The invention can also be used with continuous contact printers that employ vacuum force, such as that disclosed in U.S. Pat. No. 3,644,040, which issued Feb. 22, 1972, and that employ electrostatic force attraction, such as that disclosed in U.S. Pat. No. 3,650,623, which issued Mar. 21, 1972.

I claim:

1. A method for reducing optical interference patterns between adjacent surfaces of a first piece of transparent material and a second piece of material, at least one of the pieces being flexible, the method comprising the steps of:

positioning the pieces side by side so at least a portion of the adjacent surfaces of the pieces are spaced apart a distance in the order of magnitude of the wavelength of light;

directing light through the first piece onto the second piece; and applying to the flexible piece a time variable direction oscillating force in opposite directions substantially parallel to the adjacent surfaces to vary the distance and/or angle between the spaced apart portions of the adjacent surfaces.

2. The method of claim 1, in which the positioning step holds most of the adjacent surfaces of the first and second pieces of material in intimate contact, the spaced apart portions occurring where one of the adjacent surfaces deviates from flatness.

3. The method of claim 2, in which the directing step directs onto the second piece light collimated substantially perpendicular to the adjacent surfaces.

4. The method of claim 3, in which the applying step applies a periodically variable force to the flexible piece.

5. The method of claim 1, in which the directing step directs onto the second piece light collimated substantially perpendicular to the adjacent surfaces.

6. The method of claim 1, in which the applying step applies a periodically variable force to the flexible piece.

7. A method of reducing optical interference patterns between adjacent flat surfaces of a flexible photographic transparency and a sheet of photosensitive material, the method comprising the steps of:

placing the adjacent surfaces of the transparency and the sheet in intimate contact, small non-uniform separations between some areas of the adjacent surfaces in the order of the wavelength of light being formed by irregularities in the adjacent surfaces and/or entrapment of foreign particles of air;

directing collimated light through the transparency onto the adjacent surface of the sheet to expose selective areas of the photosensitive material while the transparency and the sheet are in intimate contact; and applying to the transparency while the photosensitive material is being exposed a time variable force to introduce time variable changes in the separations and/or angles between the adjacent surfaces.

8. The method of claim 7, in which the directing step directs the light through the transparency so the light is collimated transverse to the adjacent surfaces.

9. The method of claim 7, in which the applying step applies to the transparency a force that has a substantial component parallel to the adjacent surfaces, the said component reversing direction periodically.

10. The method of claim 7, in which the transparency is an elongated first ribbon, the sheet is a coating of photosensitive material disposed on a flexible elongated second ribbon, the directing step occurs in an exposure zone along the path of the ribbons, the method comprising the additional step of transporting the two ribbons while in intimate contact with each other and the applying step comprises the step of producing a spatially distributed variable force field in the exposure zone along the path of the ribbons.

11. A method of reducing optical interference patterns between a first flexible length of film bearing an image transparency and a second flexible length of film bearing a photosensitive coating, the method comprising the steps of:

guiding the lengths of film to form partially contiguous film paths;

transporting the lengths of film along their respective paths;

maintaining the photosensitive coating of the second length in intimate contact with the first length where the paths are contiguous, portions of the contacting surfaces being spaced apart a distance in the order of magnitude of the wavelength of light where one of the surfaces deviates from flatness;

transmitting collimated light through the first length onto the photosensitive coating of the second length where the paths are contiguous to expose the photosensitive coating according to the image on the first length; and exerting a spatially variable force that alternates in magnitude along one of the lengths where the light is transmitted through the first length onto the second length so as to change the distance that the portions of the contacting surfaces are spaced apart and/or the angle between the spaced apart portions of the contacting surfaces as the photosensitive coating is exposed.

12. The method of claim 11, in which the exerting step exerts a spatially variable force that alternates in direction along the one length.

13. The method of claim 11, in which the maintaining step comprises exerting air pressure against the non-adjacent surfaces of the first and second lengths to force them together and the exerting step comprises forming oppositely flowing air streams along the non-contacting surface of the one length where the light is transmitted through the first length onto the second length.

14. The method of claim 13, in which the air stream forming step forms an arcuate air stream that has a varying component parallel to the one length.

15. Apparatus for holding first and second flexible information storage ribbons in intimate contact with each other, the apparatus comprising:

means for transporting the first and second ribbons along partially contiguous paths;

means for supporting the second ribbon along the contiguous portion of its path;

a trough shaped housing overlying the non-contiguous surface of the first ribbon to form a space reduction near its edges;

means for introducing gas under pressure into the space enclosed by the housing and the first ribbon to exert gas pressure against the non-contiguous surface of the first ribbon and force the contiguous surfaces of the first and second ribbons into intimate contact, areas of the contacting surfaces being non-uniformly spaced apart a small distance due to surface irregularities or entrapment; and means for exerting a spatially variable force along the non-contiguous surface of the first ribbon in the contiguous portion of its path to change the distance and/or angle between the spaced apart areas of the contracting surfaces as the first and second ribbons are transported.

16. The apparatus of claim 15, in which the means for exerting a spatially variable force comprises a block of material disposed in the housing and having a first side closely adjacent to the non-contiguous surface of the first ribbon, a plurality of transverse grooves formed in the first side of the block at spaced apart locations along the path of the first ribbon, means for supplying gas under pressure to one of the grooves, and means for removing gas from another of the grooves adjacent to the one groove to establish a gas stream from the one groove to the other groove, the gas stream exerting a spatially variable force along the non-contiguous surface of the first ribbon.

17. The apparatus of claim 15, in which the means for exerting a spatially variable force along the non-contiguous surface of the first ribbon comprises a block of material disposed in the housing and having a first side closely adjacent to the non-contiguous surface of the first ribbon, a first plurality of transverse grooves formed in the first side of the block at spaced apart locations along the path of the first ribbon, means for supplying gas under pressure to the first plurality of grooves, a second plurality of transverse grooves formed in the first side of the block between respective ones of the first plurality of transverse grooves, and means for removing gas from the second plurality of grooves to establish gas streams from each one of the first plurality of grooves to the adjacent ones of the second plurality of grooves, the gas streams exerting a spatially variable force along the non-contiguous surface of the first ribbon.

18. The apparatus of claim 17, in which the block of material is transparent and the apparatus additionally comprises a light source located at the side of the block opposite the first side and directed so as to transmit light through the block onto the first ribbon.

19. The apparatus of claim 18, in which a third plurality of grooves are formed in a side of the block perpendicular to the first side, the third plurality of grooves meeting respective ones of the first plurality of grooves at one edge of the block and being covered by one side of the housing to form closed channels, and the means for supplying gas under pressure comprises a source of air under pressure connected to the third plurality of grooves.

20. The apparatus of claim 19, in which a fourth plurality of grooves are formed in a side of the block perpendicular to the first side and parallel to the side in which the third plurality of grooves are formed, the fourth plurality of grooves meeting the respective ones of the second plurality of grooves at one edge of the block and being covered by one side of the housing to form closed channels, and the means for removing gas comprises a vent to the atmosphere connected to the fourth plurality of grooves.

21. The apparatus of claim 20, in which the side of the block opposite the first side has transverse opaque strips in registration with the first and second plurality of grooves.

22. The apparatus of claim 21, in which the means for supporting the second ribbon is a microporous platen across with the non-contiguous surface of the second ribbon passes and means for forcing gas through the platen to form a gas cushion between the platen and the non-contiguous surface of the second ribbon.

23. The apparatus of claim 15, in which the means for exerting a spatially variable force along the non-contiguous surface of the first ribbon comprises means for establishing a plurality of oppositely directed streams of gas along the non-contiguous surface of the first ribbon.

24. The apparatus of claim 15, in which the means for exerting a spatially variable force along the non-contiguous surface of the first ribbon comprises means for establishing a plurality of oppositely directed arcuately shaped streams of gas along the non-contiguous surface of the first ribbon.

* * * * *